EARL E. MAEL
Inventor

May 9, 1933.　　　　E. E. MAEL　　　　1,908,377
WEEDER AND HARROW
Filed April 15, 1932　　　3 Sheets-Sheet 2
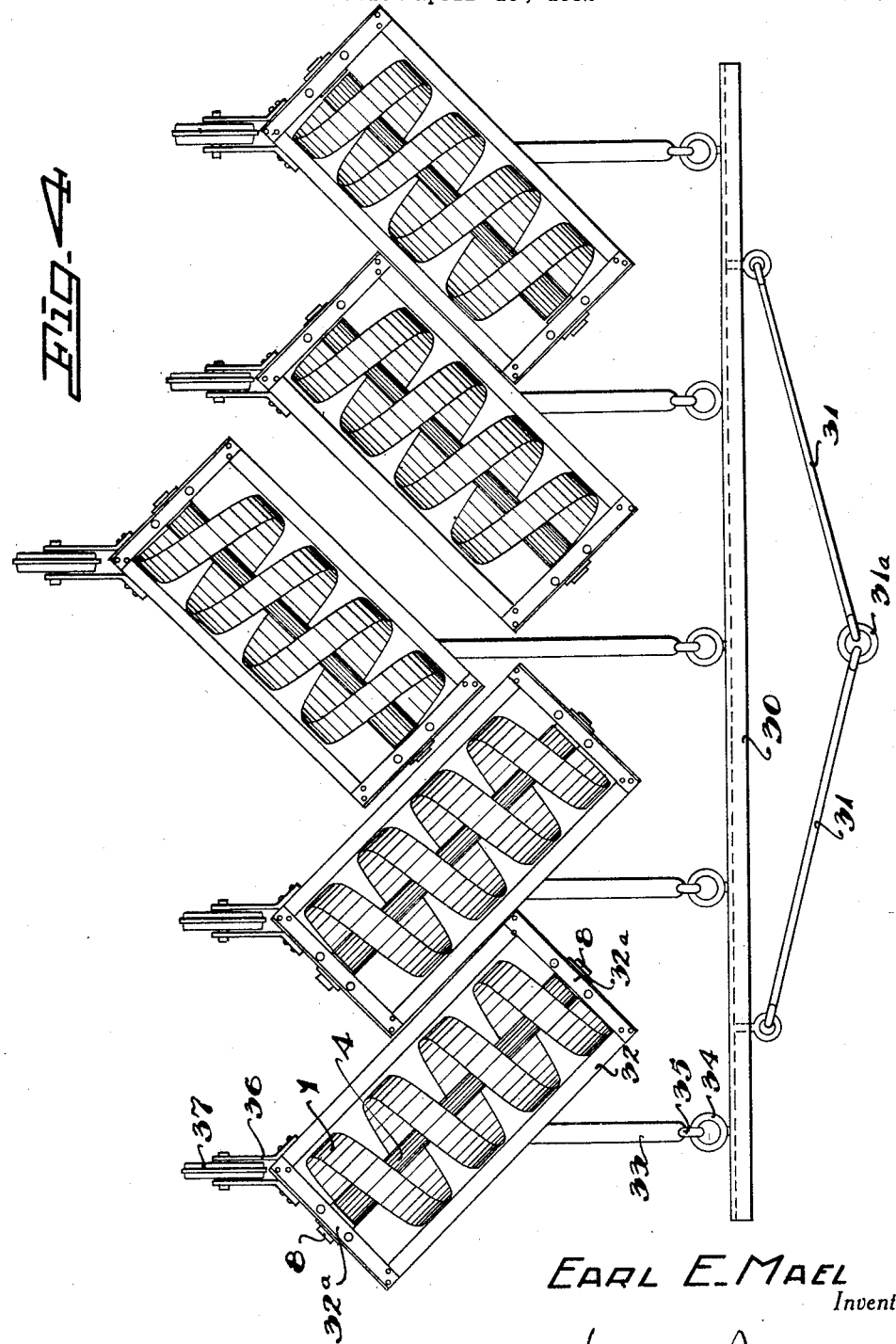
Earl E. Mael
Inventor
By　Herbert E. Smith
Attorney

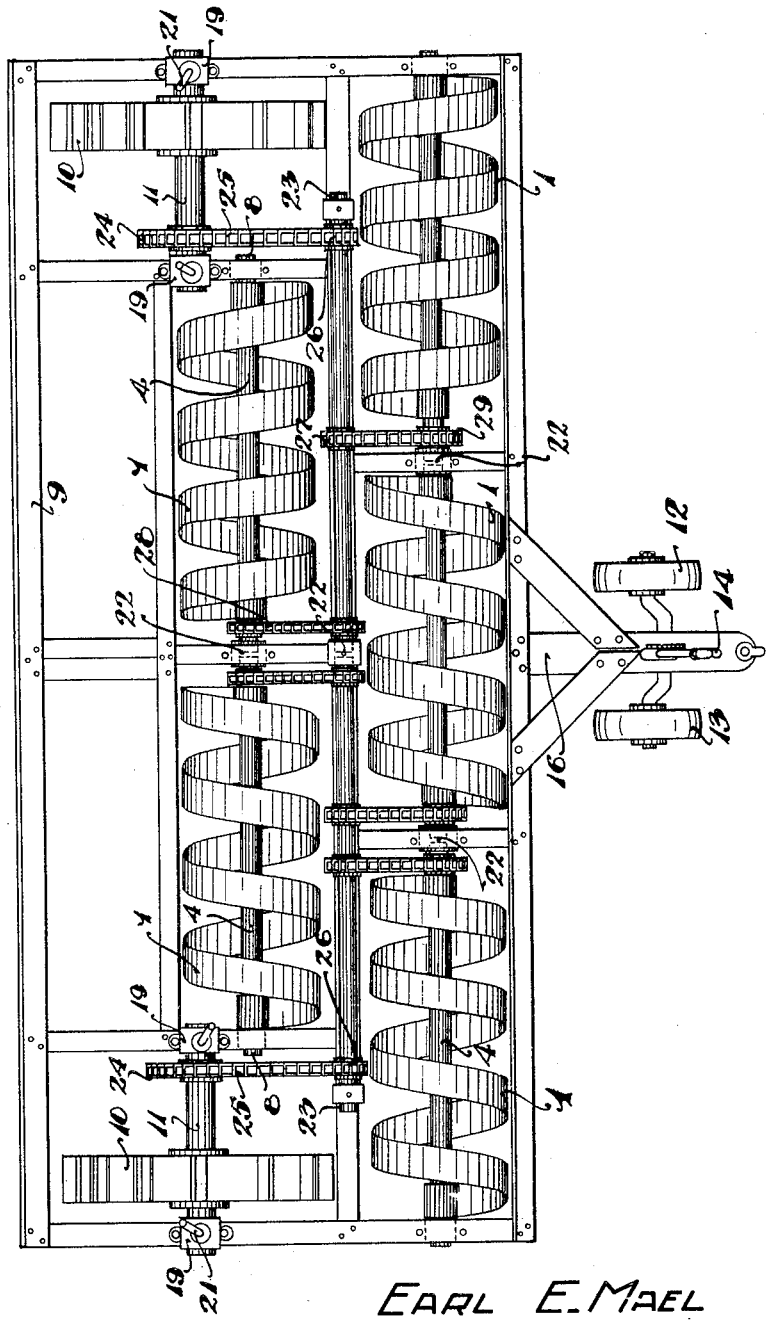

Patented May 9, 1933

1,908,377

UNITED STATES PATENT OFFICE

EARL E. MAEL, OF PULLMAN, WASHINGTON, ASSIGNOR OF ONE-HALF TO ANNIE CLYDE, OF PULLMAN, WASHINGTON

WEEDER AND HARROW

Application filed April 15, 1932. Serial No. 605,446.

My present invention relates to an improved weeder and harrow of the type designed to be dragged or drawn either by horse power or mechanical power, for the purpose of cutting out weeds and also for mulching the soil. The primary object of my invention is the provision of an agricultural implement of this character which is strong and rugged in construction, durable, and proficient in the performance of its functions in the cultivation of the soil.

In carrying out the principles of my invention I equip the implement with a suitable number of revolving cutters each having a helical or spirally arranged cutting blade, and these cutting blades are traction operated, in direct frictional contact with the soil, or through the use of power transmission mechanism between a traction driving wheel and the revolving cutters.

The helical cutters are mounted in such manner that, as the cutters revolve, a shearing action accompanies the cutting of the weeds and the mulching of the soil, thus insuring a minimum of resistance to the advance of the cutting blade, and a maximum efficiency in the cutting of the weeds at their roots, and in mulching the soil. Because of this minimum resistance to the advancing cutters, I am enabled to employ a sufficient number of cutters or cutting units to cut a comparatively wide swath without imposing an excess load on the horse-drawn implement, and also without necessity for use of a highpowered mechanical tractor or similar implement.

My invention consists in certain novel combinations and arrangements of parts as will hereinafter be more fully illustrated and claimed. In the accompanying drawings I have illustrated a wheeled implement and a drag implement, showing examples of the physical embodiment of my invention, and in which the parts are combined and arranged according to modes I have devised for the practical application of the principles of my invention.

Figure 4 is a plan view of an implement of the drag type in which the principles of my invention are embodied.

Figure 5 is a plan view of the wheeled implement of Figure 1.

Figure 1:
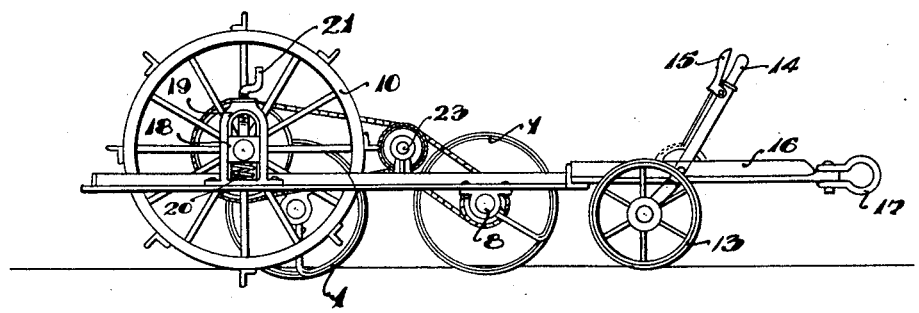
Figure 1 is a view in side elevation of a wheeled implement embodying the principles of my invention.

In Figure 1 I have illustrated a revolving cutter, which is designated as 1, and fashioned in the form of a helical or spiral blade of suitable diameter and length, and made up of metal having tempered cutting edges 2 and 3 that are beveled as usual. The double cutting edges permit the revolving cutter to be disposed in alternately reversed positions to bring the respective edges into working position, and as indicated in the drawings, these revolving cutters may be employed in suitable numbers in an implement and arranged at various angles to the direction of travel of the implement.

The revolving cutters are arranged at such angles as to give the cutting edges 2 or 3 of the blades a shearing action in cutting the roots of weeds, or in passing through the top soil for mulching the latter, and it will be understood that revolving cutters are adjusted to the proper height for proficient work in weeding and mulching.

Figure 2:
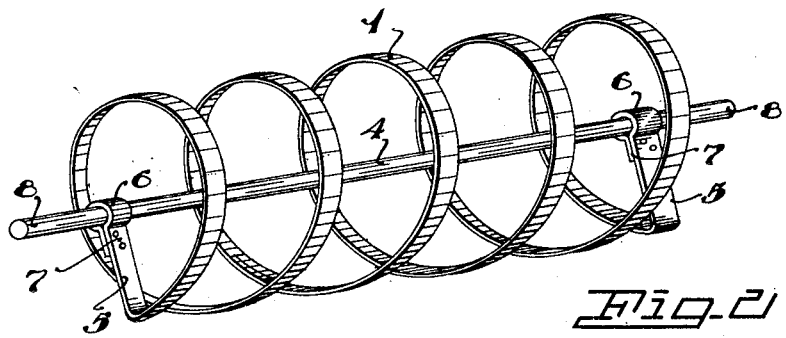
Figure 2 is a perspective view of one of the revolving cutters.
Figure 3:
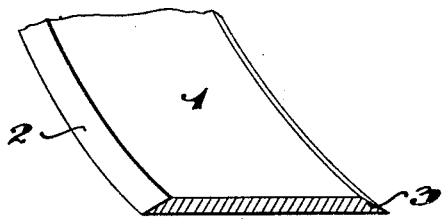
Figure 3 is a transverse sectional view in perspective of a portion of one of the revolving cutters, showing its double cutting edges that are adapted for alternate use.

Each revolving cutter is provided with a shaft 4, and the cutter blade is fashioned with end attaching arms 5 which are formed with attaching sleeves 6 secured with flanges 7 and rivets or bolts, as best seen in Figure 2. The ends 8, 8, of the shaft 4 project beyond the ends of the revolving cutter to form journals for the support of the revolving cutters, and it will be apparent that each cutter is reversible, that is, its shaft may be turned end for end, in use to bring the cutting edges 2 and 3 into alternate use, if desired.

In Figures 1 and 5 I have illustrated a wheeled implement equipped with five of the revolving cutters, a front group of three cutters being arranged in alinement and a rear group of two cutters being shown in alinement, and extending transversely of the implement, in order that their cutting edges may have a shearing effect or shearing action on the weeds and soil as the implement advances and the cutters are revolved by the movement of the implement.

This implement includes a rigid main frame, of rectangular shape, indicated as 9, and the frame is supported by a pair of wheels 10, 10, that are used as traction or power wheels for revolving the cutters or cutter units. Each traction or drive wheel has a short axle as 11 arranged in co-axial alinement and located at opposite sides of the frame and near the rear of the frame. At the front of the implement a pair of steering wheels 12, 12 are journaled on the transversely extending crank-axle 13, and this axle is provided with an operating lever 14 and ratchet device 15 by means of which the axle is turned to raise or lower the main frame, with the axles 11 as a pivot, for the purpose of adjusting the revolving cutters, and for the purpose of lifting the cutters to inoperative position when desired, or necessary. The implement is provided with a draft tongue 16 and clevis 17 for the attachment of draft horses, or for the attachment of mechanical draft means, and it will be understood of course that the implement is drawn along the ground, and the revolving cutters are revolved through power generated from the traction wheels 10, and transmitted to the shafts 4 of the cutters.

The driving axles 11, are journaled in bearing blocks 18 that are adjustable as to height with relation to their housings 19, and within each housing, below the bearing block, a spring 20 is employed to give a resilient support to the bearing block and to permit adjustment of the block. Each block is provided with an adjusting bolt 21 that is threaded through the top of the housing and has a loose connection with the bearing block, and it will be apparent that by turning the adjusting bolt in its threaded bearing in the housing, the block may be depressed with relation to the housing, and thereby compress the spring 20 to increase its tension. By turning the adjusting bolt in opposite direction, the tension of the spring is decreased, and the latter is permitted to afford a more flexible or resilient support for the bearing block. By this arrangement of the springs the main frame (and its cutters) through the housings, provide a suspending means for the several cutters, which permits the main frame and cutters to rise, with relation to the traction wheels and their axles, when the cutters encounter irregularities in the ground surface, and the resilient means thus hold the cutters to their work.

The opposite ends 8, 8, of the cutter shafts are journaled in bearings 22 of the main frame, and a power shaft or countershaft 23 is also journaled in similar bearings 22.

The power shaft is disposed transversely of the implement, parallel with the driving axles and the shafts of the cutters, and located intermediate the front and rear groups of cutters, as seen in Figure 5.

Power is transmitted from the two driving axles 11, 11, by means of a sprocket gear 24 on each axle, sprocket chains 25, and the two sprocket gears 26 mounted on the opposite ends of the power shaft. Each revolving cutter is provided with a chain drive from the power shaft which includes the driving sprocket 27 on the power shaft, a sprocket chain 28, and a driven sprocket 29 on the cutter shaft 4.

In the drag type of implement illustrated in Figure 4 the revolving cutters are arranged in two pairs at opposite sides of the longitudinal center of the implement, with the shafts of the cutters disposed on lines at approximate right angles, and a fifth cutter is centrally located in the implement, with its axis of rotation parallel with a pair of the front cutters, all of the cutters being disposed on lines at approximately right angles to the direction of travel of the implement. The forward, helical, or spiral cutting edge of the blades, in each instance, is presented to the weeds in such manner as to effect a shearing action with a minimum of resistance from the weeds, or from the soil as the latter is being mulched.

The drag frame is of flexible character and includes a front drag-bar 30 extending transversely of the implement, which bar is provided with the usual draft links 31, 31 and ring 31a, to which the draft horses, or draft appliance, are hitched or coupled.

At the rear of the drag bar are located a number of cutter frames 32, and the several cutters, are disposed within these frames, with their shafts 4 journaled in bearings 32a of the frames.

Each of the rectangular frames 32 is provided with a tongue 33, attached to the frame and disposed longitudinally of the implement, and the tongues are flexibly connected to the transverse drag bar by means of eye-bolts 34 on the drag bar and eyes 35 on the tongues.

At the rear end or corner of each of the cutter frames a forked bracket 36 is attached, and a small wheel or roller 37 is journaled in each of the brackets.

As thus illustrated and described, it will be apparent that each of the revolving cutters, through the instrumentality of its rectangular, diagonally disposed frame 32, is separately supported at the rear on one of the rollers or wheels 37, and at the front of the implement each frame is flexible coupled or connected to the drag bar 30. The front of the implement, or the drag bar, is supported from the draft power, while the weight or load of the frames and their revolving cutters, is supported on the revolving cutters and their rear wheels or rollers 37, and the revolving cutters are of course journaled in their frames in such position as to present their cutting edges to the roots of the weeds. The overlapping arrangement of the revolving cutters insures that the entire swath, or the full width of the machine or implement, is cut by the revolving cutters, with the same effect as the two groups of overlapping, axially alined cutters in Figure 5.

Having thus fully described my invention, what I claim as new and desire to secure by Letters Patent is:—

1. In a wheeled implement of the traction operated type, the combination with a main frame and front steering wheels, of a pair of spaced traction wheels and axles for said wheels, housings on said frame and bearing blocks for the axles mounted in said housings, resilient supports on the frame for said blocks, means for vertically adjusting said blocks in the housings, and a plurality of revolving cutters journaled in the frame.

2. In a wheeled implement of the traction operated type, the combination with a main frame, of a pair of traction-driving wheels and axles therefor, journal-bearing blocks for said axles, housings mounted on the frame for said blocks, resilient supports between said frame and housings, and a screw bar mounted in each housing having a loose connection with a bearing block, for the purpose described.

3. In a wheeled implement of the traction operated type, the combination with a main frame, a pair of traction-driving wheels having axles and bearings for said axles, of resilient supports on the frame for said bearings, means for vertically adjusting said bearings relatively to said frame, a plurality of helical revolving cutters journaled in the frame and arranged in front and rear groups, a power shaft journaled between said groups, power transmission means between said axles and said power shaft, and power transmission mechanism between the power shaft and said revolving cutters.

4. In a wheeled implement, the combination with a main frame, a pair of traction-wheels having axles and bearing blocks for said axles, resilient supports on the frame for said blocks, a housing for each block, a screw bar mounted in each housing having a loose connection with a block, a plurality of helical revolving cutters journaled in the frame and arranged in front and rear groups, a power shaft journaled between said groups and power transmission mechanism between said shaft and cutters, and power transmission mechanism between said axles and the power shaft.

In testimony whereof I affix my signature.

EARL E. MAEL.